United States Patent Office 2,764,767
Patented Oct. 2, 1956

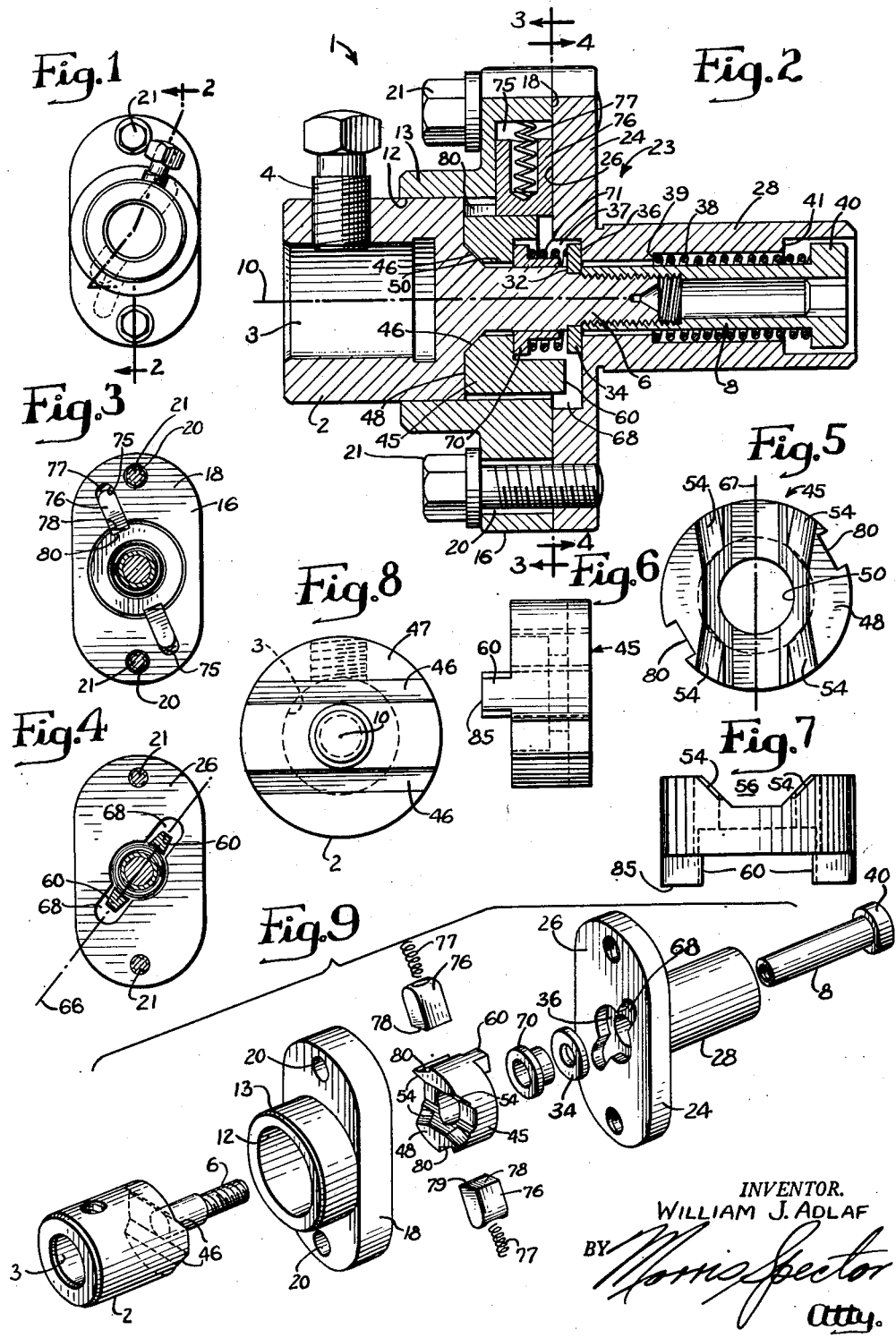

2,764,767

RELEASABLE SCREW THREADING TOOL HOLDER

William Joseph Adlaf, Chicago, Ill., assignor to Boyar-Schultz Corporation, Chicago, Ill., a corporation of Illinois Application September 20, 1952, Serial No. 310,691

9 Claims. (Cl. 10—89)

This invention relates to tool holders, such as tapping tool holders, for automatic screw machines, turret lathes and the like, and more particularly to holders of the releasing type.

Tool holders of the type with which the present invention is particularly concerned are provided with means on one end for mounting the same in a machine and means at the opposite end for receiving and holding a tool, such as a tapping die, and a clutch is provided between the two ends for connecting and disconnecting the two ends so that the tool holding end may at one time be locked against rotation with respect to the other end and at other times be permitted free rotation, selectively, clockwise or counterclockwise. Such holders generally are provided with means for completely separating the clutching teeth in response to an initial separation thereof, so that the surfaces or edges that have been removed out of clutching engagement shall not strike one another during continued relative rotation of one of the parts of the tool holder with respect to the other. This type of releasing tool holder is shown in United States Patent to Cote, No. 2,505,030, to which reference may be had.

It is one of the objects of the present invention to provide a tool holder of the above mentioned character which is so constructed as to permit relative adjustment of the two parts of the tool holder as may be required due to wear of the parts of the machine in which the tool holder is mounted. For instance, in the case of a tapping tool which in its tapping operation operates on a work piece that is being rotated, and wherein the tool is advancing towards the work as the tapping progresses, it is essential that the tapping tool shall be properly centered with respect to the work. It is one of the objects of the present invention to provide a tap holder wherein the clutch that effects the releasing operation is so arranged, with respect to the two parts that are adapted to be engaged by the clutch, as to permit relative adjusting movement of the clutch with respect to the two parts in two directions at right angles to one another, in amounts necessary to bring the tap holder of the tool in proper alignment with respect to the work.

It is a further object of the present invention to provide a releasing tool holder of the above mentioned character that is simple and economical of construction and that has a very few parts and therefore is not likely easily to get out of adjustment.

The attainment of the above and further objects of the present invention will be apparent from the following specification taken in conjunction with the accompanying drawing forming a part thereof.

In the drawing:

Figure 1 is an end view of a releasing tap holder embodying the present invention;

Figure 2 is a sectional view taken along the line 2—2 of Figure 1 and drawn to an enlarged scale;

Figure 3 is a sectional view taken along the line 3—3 of Figure 2 and looking in the direction of the arrows;

Figure 4 is a sectional view taken along the line 4—4 of Figure 2 and looking in the direction of the arrows;

Figure 5 is a plan view of the clutch driver as seen from the left hand side of Figure 2;

Figure 6 is an end view of the clutch driver of Figure 5;

Figure 7 is a view similar to Figure 6 and taken at 90° thereto;

Figure 8 is a view of the tool holder of Figure 1 as taken from the right hand side of Figure 2; and Figure 9 is an exploded perspective view showing the parts constituting the releasing tap holder of the present invention.

Reference may now be had more particularly to the drawing wherein like reference numerals designate like parts throughout.

The tap holder of the present invention, indicated in general by the reference numeral 1, comprises a tool holder 2 having a centrally located cylindrical bore 3 that is adapted to receive a tapping tool that fits into the bore and is locked into position by a tool locking screw 4. The bore 3 is cylindrical in shape and coaxial of the tool holder 2. The tool holder 2 has a rearwardly extending axial stem 6 extending therefrom and threaded to receive a collar spacing nut 8. The tool holder 2 is cylindrical in shape centered on the longitudinal axis 10 and extends into a cylindrical bore 12 in a tool head 13, which tool head terminates in a flange 16 that has a flat surface 18 that lies in a plane at right angles to the longitudinal axis 10. The flange 16 has a number of oversized bolt-receiving holes 20 that receive bolts 21 for bolting the tool head to a tool body 23. The tool body includes a flange 24 having a planar mounting surface 26 that is in a plane at right angles to the longitudinal axis 10 of the tap holder. The bolts 21 thread into tapped holes in the flange 24. The planar face 18 of the tool head bears against the planar face 26 of the tool body. Before tightening of the bolts 21 the tool head may be shifted to the limits permitted by the clearance between the shanks of the bolts and the oversized bolt holes 20 for adjustment purposes, as will be explained more fully, and then, by tightening of the bolts, the tool head and tool body are firmly clamped together. The tool body has a cylindrical, hollow mounting shank 28 adapted to be mounted in a turret of a machine, the longitudinal axis of the shank being at right angles to the planar surfaces 18 and 26 and being substantially in line with the axis 10 of the tool holder but not necessarily exactly in line therewith, the difference being determined by the amount of adjustment of the surface 18 and the surface 26, as previously described.

The stem 6 has a shoulder 32 around its periphery that bears against a tool holding stop collar 34 which in turn bears against a surface 36 in a central circular bore 37 formed in the flange 24. The nut 8 threads on the shank 6 until the nut bears against the collar 34, thus maintaining the collar in engagement with the shoulder 32. The stem 6 extends into the shank 28 and is held in place by a coiled compression spring 38 that bears at one end on a shoulder 39 of the shank 28 and at its opposite end on the under side of a head 40 integral with the spacer nut 8 that is threaded on the shank 6. The center of the head 40 has a conventional key slot for receiving a key for turning the nut 8. The spring is maintained in compression and thus draws the stem and with it the tool holder to its limiting position within the tool head, as illustrated in Figure 2. The tool holder may be manually forced to the left of its position illustrated in Figure 2, against the action of the spring 38, until the nut head 40 bears against an internal shoulder 41 in the shank 28.

The tool holder is adapted to be clutched to the tool body by means of a driver 45. For this purpose the tool holder has a pair of flat surfaces 46—46 formed thereon equally spaced on opposite sides of the axis 10, said surfaces being at right angles to one another and each at 45° to the axis 10, said surfaces extending along the rear wall 47 of the body 2 of the tool holder, which wall is a plane surface at right angles to the axis 10. The driver 45 is of a circular external shape and has a flat wall 48 that may bear against the wall 47. The stem 6 extends through a central circular bore 50 which bore is oversized with respect to the driver slightly more than the amount that the bolt holes 20 are oversized with respect to the shanks of the bolts 21. The driver 45 has on the front face 48 thereof a slot for receiving the surfaces 46—46. The sides of the slot constitute coupling means comprising four planar surfaces 54—54, the opposite surfaces 54—54 being somewhat inclined to one another, the arrangement being such that by slightly turning the tool holder with respect to the driver in one direction or the other, parts of the two surfaces 46 engage one set of diagonally opposite surfaces 54 or another set of diagonally opposite surfaces 54, depending upon the direction of turning of the tool holder. The two sets of surfaces 54 together form a trapezoidal slot 56 that is adapted to embrace the surfaces 46—46. The side of the driver that faces the tool body has coupling means comprising a pair of clutch teeth 60—60 in alignment 180° apart, the central axis 66 of which is made exactly 90° to the central axis 67 between the surfaces 54—54 for a purpose which will be apparent as this description proceeds. The clutch teeth 60 are adapted to enter aligned slots 68 in the surface 26 of the flange 24 for clutching the driver to the tool body. When these teeth are in the slots 68 the driver has clearance in the slot and within the limits of this clearance the driver is held by the tool body against rotation. A collar 70 is pressed by a spring 71 to press the driver constantly toward the tool holder, said spring bearing at one end against a peripheral flange on the collar 70 and at its opposite end against the tool-holding stop collar or washer 34.

The surface 18 of the tool head flange 16 has a pair of aligned pawl-receiving slots 75—75 formed therein in each of which is slidably placed a pawl 76 and a coiled spring 77 that constantly presses the pawl radially inwardly. Each pawl fits and is slidable in the pocket formed by the slot 75 and the wall surface 26 of the flange 24 of the tool body. Each pawl has a tapered or inclined end 78 terminating in a blunt edge 79. The inclined end 78 is adapted to enter into one or another of two diametrically opposed rectangular slots 80 that extend axially in the periphery of the driver 45. Each slot 80 has two side walls at right angles to the base portion of the slot. The width of the pawl in the direction as seen in Figure 3, that is, at right angles to the direction as seen in Figure 2, is substantially equal to the width of each slot 80. When the pawls are in the position illustrated in Figure 3 they lock the driver against rotation with respect to the tool head 13 in a direction counter-clockwise as seen in Figure 3, while permitting rotation in a direction clockwise as seen in Figure 3. Each of the pawls 76 may be reversed in its slot so that the inclined surface 78 slopes opposite to that illustrated in Figure 3, in which case the pawls would prevent rotation of the driver with respect to the tool head in a direction clockwise as seen in Figure 3, but permit relative counter-clockwise rotation. Each of the pawls 76, therefore, constitutes a unidirectional clutch for connecting the driver with the tool head 13 to permit relative rotation of the tool in one direction but to lock it if an attempt is made to rotate the driver in the opposite direction, and each of the pawls is reversible to enable the operator to change the direction of permissive rotation or of locking.

An explanation will now be given of the manner of using the tool holder thus far described. An internal or external tap-forming die is inserted into the bore 3 of the tool holder 2 and is locked in place by tightening the locking screw 4. The unit is mounted as in a turret of a turret lathe or automatic screw machine, the mounting shank 28 extending into the proper place in the turret and being keyed in place by tightening of the screw, so that the tool body 23 is non-rotatable about its longitudinal axis. The tool head may then be loosened from the tool body, as by slightly loosening the bolts 21, and the tool head may be slid to slide the surface 18 thereof along the surface 26 of the tool body within the limits of clearance of the shanks of the bolts 21 in the bolt holes 20. This adjustment is made to bring the longitudinal axis 10 of the tap into precise alignment with the work, which work is locked as, for instance, in a collet chuck that is axially rotated by the machine. This adjusting movement may bring the longitudinal axis 10 of the tool holder slightly out of alignment with the longitudinal axis of the shank 28, but these axes are maintained parallel by the surface to surface engagement of the plane faces 18 and 26. This adjustment is possible notwithstanding the fact that the driver is in clutching engagement at its left hand side with the tool holder and at its right hand side with the tool body because of the fact that the engagements on opposite sides are at right angles to one another, the axis 67 being at right angles to the axis 66. Because of this arrangement the driver clutch teeth 60—60 are free to slide in the slots 68—68 in the direction of the axis 66, within the limits of clearance of the parts, and the tool holder is free to slide with respect to the clutch along the axis 67, that is, at right angles to the axis 66. After proper adjustment has been obtained the bolts 21 are tightened, thus locking the tool head to the tool body.

The spring 38 bearing against the head of the nut 40 maintains the tool holder in the position shown in Figure 2 where the shoulder 32 of the stem 6 bears against the tool holder stop collar 34. At this time the teeth 60 are within the slots 68. The turret that holds the tool holder is then advanced by the operator in a direction parallel to the longitudinal axis 10 until the end of the threading tool or die that is held by and extends from the tool holder comes into engagement with the axially rotating work. The operator advances the turret slightly further, thus bringing the tap into threading engagement with the work. As soon as the tap engages the axially rotating work there is a torque applied to the tap which tends to turn it, thereby tending to turn the tool holder in a direction which is assumed to be clockwise as seen in Figure 3. The application of this torque, clockwise or counter-clockwise, causes the tool holder to turn and thus bring parts of the surfaces 46 into driving engagement with one set or the other set of the diagonally opposite surfaces 54—54 on the driver, thereby applying a driving torque to the driver. The driver turns until the clutch teeth 60—60 take up the clearance within the slot 68 and engage the wall surfaces of the slot 68, whereupon further turning of the driver with respect to the tool body is prevented. The teeth 60—60 are so tapered that when the clearance between the teeth and the corresponding walls of the slot 68 is taken up the teeth make surface contact with the corresponding walls of the slot 68. As the rotating work continues to apply torque to the tap, which is now held against further rotation, the surfaces 46—46 bearing against the inclined surfaces 54—54 of the driver cam the driver in a direction to the right as seen in Figure 2, thus bringing the teeth 60—60 deeper into the slots 68. This continues until the driver stop collar 70 engages the stop collar or washer 34, this action compressing the spring 71. Thenceforth the tool holder is firmly held against rotation with respect to the tool body, thereby holding the tap against rotation. As the work continues to turn it tends to draw the tool head to the left as seen in Figure 2. The operator operates the turret in which the shank 28 is mounted to advance the turret and cause it to follow the tap as the tap is drawn to the left as seen in Figure 2. This action continues as the work continues to rotate and the tap threads further and further upon the work. As the turret that carries the tap holder advances axially it finally comes to a stop which is adjustably set on the machine to limit the advance of the turret, the distance that the stop is initially set in advance of the turret being determined by the length of the thread that it is desired to form. As the tapping tool continues its advance and continues advancing the holder 2, the holder merely compresses the spring 38. This continues until the teeth 60 leave the slots 68. When this happens there is no longer a clutching engagement between the tool body and the tool holder, so that the tool holder is now free to rotate within the tool head 13. There is now no longer any torque applied to the driver 45, and the spring 71 immediately pushes the driver to the left to bring it into engagement with the surface 47 (Fig. 2) of the tool holder 2. This additional axial movement of the driver is very small but it is sufficient to produce clearance between the edges 85 of the clutch teeth 60 and the surface 26 of the tool body.

Continued rotation of the work results in continued turning of the tool holder in a direction clockwise as seen in Figure 3, the pawls 76 merely clicking each time the slots 80 come opposite the pawls 76. This continues until the operator reverses the direction of rotation of the work in order to unthread the tap from the work. When the operator reverses the direction of rotation of the work the reverse rotation of the tool holder will be possible only until the slots 80 come opposite the pawls 76. When this occurs the pawls enter the slots and prevent rotation of the driver, thereby preventing rotation of the tool holder. When the tool holder is held against rotation, the continued rotation of the work in a direction counter-clockwise as seen in Figure 3 causes the tap to unthread from the work. As the tap tends to unthread from the work and tends to push on the turret in which the shank 28 is mounted, the operator operates the machine to retract the turret so that the tool is moved to the right as seen in Figure 2 in a manner to cause it to follow the pushing action of the threads on the work unthreading from the tap held within the holder 2. It is to be noted that when the slots 80 are in a position for engagement by the pawls 76 the clutch teeth 60 are in a position for engagement in the slots 68.

The above description sets forth how the tap holder can be caused to form threads in one direction and then unthread from the work. If threads are to be formed in the opposite direction the bolts 21 are removed and the pawls 76 are reversed so that the sides 78 of the pawls face the slots 80 of the driver in the opposite direction from that illustrated in Figure 3, to permit rotation only in a direction opposite from that previously described and, of course, an appropriate tap is used. It is thus apparent that the releasing tap holder of the present invention may be used to cut right hand or left hand threads as desired.

From the above description it is apparent that there has here been provided a releasing tap holder that can be mounted in a turret where it is held against rotation and wherein the tool or work holder 2 is automatically released from rotation about its axis 10 when the threading operation has been completed, and wherein the holder 2 can be adjusted so that its longitudinal axis is accurately aligned with the axis of rotation of the work even though this adjustment brings the axis 10 of rotation of the holder 2 slightly out of line with the longitudinal axis of the shank 28.

In the above description it has been assumed that a tap is placed in the tool holder 2 and that the work is rotated. It is obvious from the above description that a piece of work to be threaded can be mounted in the tap holder 2 where it is held against rotation in the manner previously described, and the tap can be mounted on the machine for rotation.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A device of the type described having a mounting part, a tool carrying part, and mounting means mounting the tool carrying part for rotation and axial movement with respect to the mounting part, said mounting part and the said means having cooperating abutting surfaces at least one of which is a plane at right angles to the axis of rotation, said surfaces being one slidable on the other in all directions on said plane to permit relative adjustment of the two, means securing said mounting part and said mounting means together in their adjusted position, one of said parts having a coupling mounted thereon for movement between retracted and extended positions with respect to the other part, and a yielding means for urging said coupling toward its extended position; camming means keying the coupling to the said one part so as to cause a driving force on the coupling in either of opposite directions first to move the coupling to further retracted position and then lock the coupling to said one part; a pawl receiving slot in one of said abutting surfaces, a pawl in said slot, said slot being continuously covered by the other of said abutting surfaces as the two surfaces slide on one another in relative adjustment for holding the pawl against movement out of the slot in the direction of axial movement of the tool carrying part, a pawl receiving slot in the coupling and adapted to receive the pawl for locking the coupling against rotation in one direction with respect to the mounting part; and separable cooperating clutch means on the coupling and said other part, interlocking when the coupling is in retracted position and the said parts are in a predetermined relative axial position, to provide a rotary drive between the parts in either direction, the mounting for the coupling enabling it to be extended from said retracted position in a direction separating the said clutch means after the tool carrying part has first been forced axially from the said predetermined relative position to initially disengage the clutch means and relieve the driving force on the coupling.

2. A device of the type described having a mounting part, a tool carrying part, and mounting means mounting the tool carrying part for rotation and axial movement with respect to the mounting part, one of said parts having a coupling mounted thereon for movement between retracted and extended positions with respect to the other part, and a yielding means for urging said coupling toward its extended position; camming means keying the coupling to the said one part so as to cause a driving force on the coupling in either of opposite directions first to move the coupling to further retracted position and then lock the coupling to said one part; the keying means having engaging surfaces arranged to permit relative adjustment movement of said one part and the coupling with respect to one another in a direction radially of the direction of axial movement of the parts; and separable cooperating clutch means on the coupling and said other part, interlocking when the coupling is in retracted position and the said parts are in a predetermined relative axial position, to provide a rotary drive between the parts in either direction, said cooperating clutch means also having engaging surfaces arranged to permit relative adjustment movement of the interlocked teeth with respect to one another also in a direction radially of the direction of axial movement of the parts, the last mentioned engaging surfaces being at right angles to the previously mentioned engaging surfaces so that the two relative adjustment movements are at right angles to one another, the mounting for the coupling enabling it to be extended from said retracted position in a direction separating the said clutch means after the tool carrying part has first been forced axially from the said predetermined relative position to initially disengage the clutch means and relieve the driving force on the coupling.

3. A device of the type described having a mounting part, a tool carrying part, and mounting means mounting the tool carrying part for rotation and axial movement with respect to the mounting part, said mounting part and the said means having cooperating abutting surfaces one slidable on the other to permit relative adjustment of the two, means securing said mounting part and said mounting means together in their adjusted position, one of said parts having a coupling mounted thereon for movement between retracted and extended positions with respect to the other part, and a yielding means for urging said coupling toward its extended position; camming means keying the coupling to the said one part so as to cause a driving force on the coupling in either of opposite directions first to move the coupling to further retracted position and then lock the coupling to said one part; the keying means having engaging surfaces arranged to permit relative adjustment movement of said one part and the coupling with respect to one another in a direction radially of the direction of axial movement of the parts; and separable cooperating clutch means on the coupling and said other part, interlocking when the coupling is in retracted position and the said parts are in a predetermined relative axial position, to provide a rotary drive between the parts in either direction, said cooperating clutch means also having engaging surfaces arranged to permit relative adjustment movement of the interlocked clutch means with respect to one another also in a direction radially of the direction of axial movement of the parts, the last mentioned engaging surfaces being at right angles to the previously mentioned engaging surfaces so that the two relative adjustment movements are at right angles to one another, the mounting for the coupling enabling it to be extended from said retracted position in a direction separating the said clutch means after the tool carrying part has first been forced axially from the said predetermined relative position to initially disengage the clutch means and relieve the driving force on the coupling.

4. A device of the type described having a mounting part, a tool carrying part, and mounting means having a sleeve in which is mounted the tool carrying part for rotation and axial movement with respect to the mounting part, said mounting means and said mounting part together forming a housing, said mounting means and said mounting part having contacting relatively movable planar surfaces, means for securing said surfaces together in any of different relative positions, a unidirectional clutch between the sleeve of the mounting means and the tool carrying part for permitting relative rotation of the two in one direction and preventing such rotation in the opposite direction, one of said parts having a coupling mounted thereon within said housing for movement between retracted and extended positions with respect to the other part, and a yielding means for urging said coupling toward its extended position; camming means keying the coupling to the said one part so as to cause a driving force on the coupling in either of opposite directions to first move the coupling to further retracted position and then lock the coupling to said one part; and separable cooperating clutch means on the coupling and said other part, interlocking when the coupling is in retracted position and the said parts are in a predetermined relative axial position, to provide a rotary drive between the parts in either direction, the mounting for the coupling enabling it to be extended from said retracted position in a direction separating the said clutch means after the tool carrying part has first been forced axially from the said predetermined relative position to initially disengage the clutch means and relieve the driving force on the coupling.

5. A tool body having a mounting shank for mounting it and having means forming a mounting surface at right angles to the longitudinal axis of the shank for clamping of a tool head thereto, a tool head overlying said mounting surface and having journalling means for journalling a tool body for rotation about an axis substantially parallel to the longitudinal axis of the shank, said tool head being adjustable along said mounting surface, means securing it to said mounting surface in its adjusted position, a tool holder journalled in said journalling means for rotation and longitudinal movement with respect thereto, said tool holder including a stem extending into the shank lengthwise thereof and making a loose fit therein to permit shifting of the longitudinal axis of the stem with respect to the longitudinal axis of the shank as well as relative rotary movement of the two, a driver clutch loosely surrounding the stem and having coupling means on one face thereof for coupling itself to the tool holder but permitting adjusting movement thereof in a direction at right angles to the stem and having coupling means on the opposite face at right angles to the first coupling means for coupling itself to the tool body but permitting adjusting movement thereof in a direction also at right angles to the stem but at right angles to the direction of the previously mentioned adjusting movement, said driver clutch being movable between a clutching position where it is coupled to the body and the holder for clutching the two together and an unclutching position where it is uncoupled from at least one of said body and holder whereby the body and holder are unclutched from one another, and spring means for urging the driver clutch from said clutching position toward the unclutching position.

6. A device of the type described having a mounting part, a tool carrying part, and mounting means mounting the tool carrying part for rotation and axial movement with respect to the mounting part, said mounting part and the said means having cooperating abutting surfaces one slidable on the other to permit relative adjustment of the two, means securing said mounting part and said mounting means together in their adjusted position, one of said cooperating abutting surfaces having a pawl-receiving slot therein, a pawl slidable in said slot and held therein by said other abutting surface, one of said parts having a coupling mounted thereon for movement between retracted and extended positions with respect to the other part, and a yielding means for urging said coupling toward its extended position; camming means keying the coupling to the said one part so as to cause a driving force on the coupling in either of opposite directions first to move the coupling to further retracted position and then lock the coupling to said one part; and separable cooperating clutch means on the coupling and said other part, interlocking when the coupling is in retracted position and the said parts are in a predetermined relative axial position, to provide a rotary drive between the parts in either direction, the mounting for the coupling enabling it to be extended from said retracted position in a direction separating the said clutch means after the tool carrying part has first been forced axially from the said predetermined relative position to initially disengage the clutch means and relieve the driving force on the coupling, said coupling having a substantially axially extending slot in the periphery thereof cooperating with said pawl, said pawl having means on one side thereof for locking in the slot to hold the coupling against rotation in one direction and means for camming the pawl out of the slot to permit the coupling to rotate in the opposite direction, and spring means constantly urging the pawl towards the coupling whereby as the coupling rotates the pawl can enter the axial slot in the coupling to control turning thereof.

7. A device of the type described having a mounting part, a tool carrying part, and mounting means mounting the tool carrying part for rotation and axial movement with respect to the mounting part, said mounting part and the said means having cooperating abutting surfaces one slidable on the other to permit relative adjustment of the two, means securing said mounting part and said mounting means together in their adjusted position, one of said cooperating abutting surfaces having a pawl-receiving slot therein, a pawl slidable in said slot and held therein by said other abutting surface, one of said parts having a coupling mounted thereon for movement between retracted and extended positions with respect to the other part, and a yielding means for urging said coupling toward its extended position; camming means keying the coupling to the said one part so as to cause a driving force on the coupling in either of opposite directions first to move the coupling to further retracted position and then lock the coupling to said one part, said keying means included engaging surfaces on the coupling and on said one part; the keying means being arranged to permit relative adjustment movement of said one part and the coupling with respect to one another in a direction radially of the direction of axial movement of the parts; separable cooperating clutch means on the coupling and said other part, interlocking when the coupling is in retracted position and the said parts are in a predetermined relative axial position, to provide a rotary drive between the parts in either direction, said cooperating clutch means having clutch engaging surfaces at right angles to the previously mentioned surfaces and being arranged to permit relative adjustment movement of the interlocked clutch means with respect to one another also in a direction radially of the direction of axial movement of the parts but at right angles to the previously mentioned relative adjustment movement, the mounting for the coupling enabling it to be extended from said retracted position in a direction separating the said clutch means after the tool carrying part has first been forced axially from the said predetermined relative position to initially disengage the teeth and relieve the driving force on the coupling, said coupling having a substantially axially extending slot in the periphery thereof cooperating with said pawl, said pawl having means on one side thereof for locking in the slot to hold the coupling against rotation in one direction and means for camming the pawl out of the slot to permit the coupling to rotate in the opposite direction, and spring means constantly urging the pawl towards the coupling whereby, as the coupling rotates, the pawl can enter the axial slot in the coupling to control turning thereof.

8. A device of the type described having a mounting part, a tool carrying part, and mounting means mounting the tool carrying part for rotation and axial movement with respect to the mounting part, said mounting part and the said means having cooperating abutting surfaces, means securing said mounting part and said mounting means together, one of said cooperating abutting surfaces having a pawl-receiving slot therein, a pawl slidable in said slot and held therein by said other abutting surface, a coupling between said parts and movable between retracted and extended positions in one of which it connects said parts and in the other of which it permits relative rotation of said parts, said coupling having a substantially axially extending slot in the periphery thereof cooperating with said pawl, said pawl having means on one side thereof for locking in the slot to hold the coupling against rotation in one direction and means for camming the pawl out of the slot to permit the coupling to rotate in the opposite direction, and spring means constantly urging the pawl towards the coupling whereby, as the coupling rotates, the pawl can enter the axial slot in the coupling to control turning thereof.

9. A releasable tap holder comprising a mounting part for the tap holder having a mounting shank and an external flange at the forward end of said shank, a tool head having an external flange at its rear end which is slidably mounted for movement in all directions against the front face of said mounting flange and a reduced tool holder-receiving portion projecting forwardly of said tool head flange, means for movably securing said flanges together in any one of a number of adjusted positions thereof, said tool head having a bore extending from the front face of said tool holder-receiving portion and rearwardly through the tool head flange, a tool holder part reciprocably and rotatably mounted in the forward portion of the said tool head bore and having a tool-receiving bore opening onto its front end and a rear reduced neck portion extending within the rear portion of said tool head bore within the tool head flange, a coupling member loosely mounted on said neck in the rear portion of said tool head bore within said tool head flange and movable between a fully retracted rearward position and an extended forward position along said tool holder part neck, interengaging camming surfaces on said coupling member and tool holder part which confine said coupling member and mounting part to straight line relative movement and which by camming action move said coupling member axially of said tool holder part to said retracted position upon rotation of one of said coupling member and tool holder part, resilient means urging said interengaging surfaces together, an abutment shoulder formed in one of said tool head and mounting part against which a portion of said tool holder part rests to limit its rearward movement, said coupling member being in only a partially retracted position when said tool holder part is in contact with said abutment shoulder, interengageable means between said mounting part and coupling member which become disengaged when said coupling part is in said forward extended position thereof to permit said coupling member and interengaged tool holder part to rotate freely with respect to the secured together tool head and mounting part, said interengageable means confining said coupling member and mounting part for relative radial movement at right angles to the direction of relative movement between said coupling member and tool holder part and locking them for movement together in either direction when said coupling member is in its fully retracted position, whereby the tool holder part and coupling member may be securely locked in position with respect to said mounting part, one of said flanges being formed with a pawl-receiving slot, a pawl slidable in said slot and movable into the path of movement of said coupling member, a peripheral slot formed in said coupling member which is adapted to receive said pawl when the coupling member is in its extended position, said pawl having means on one side thereof for locking in the coupling member slot to hold the coupling member against rotation in one direction and means for camming the pawl out of the slot to permit the coupling to rotate in the opposite direction, and spring means urging the pawl toward the coupling member whereby, as the coupling member rotates, the pawl can enter the slot in the coupling member to control the turning thereof.

References Cited in the file of this patent

UNITED STATES PATENTS

| | | |
|---|---|---|
| 2,505,030 | Cote | Apr. 25, 1950 |
| 2,549,972 | Jones | Apr. 24, 1951 |
| 2,564,666 | Beacom | Aug. 21, 1951 |